3,189,564
PHOSPHORANES, ARSANES AND STIBANES, AND
PROCESSES FOR PREPARING THE SAME
Robert M. Washburn and Roger A. Baldwin, Whittier,
Calif., assignors to American Potash & Chemical Corporation, Los Angeles, Calif., a corporation of Delaware
No Drawing. Filed Nov. 3, 1961, Ser. No. 149,888
42 Claims. (Cl. 260—2)

The present invention relates to novel phosphorus, arsenic and antimony compounds and to processes for preparing the same.

Broadly, the novel compounds of this invention may be classed as monomeric and polymeric phosphoranes, arsanes, and stibanes and can be represented by Formulae I–VII, below. The monomeric phosphoranes, arsanes, and stibanes are represented by Formulae I–III and the polymeric phosphoranes, arsanes, and stibanes are represented by Formulae IV–VII.

The first class of monomeric phosphoranes, arsanes, and stibanes is represented by the formula $$R_{3-n}P(=Z)(N=YR'R''R''')_n \qquad (I)$$

wherein R is selected from the group consisting of aryl, alkyl, halogen, alkoxy, aryloxy, amino, alkylthio, arylthio, and azide groups;

Z is selected from the group consisting of oxygen and sulfur;

Y is selected from the group consisting of phosphorus, arsenic and antimony;

R', R'' and R''' are selected from at least one of the group consisting of alkyl, aryl, alkoxy, aryloxy, amino, alkylthio, and arylthio groups; and $n$ is a whole number of from 1 to 3.

These compounds may be prepared by reacting one mole of (a) a compound having the formula $$R_{3-n}P(=Z)(N_3)_n$$

wherein R is selected from the group consisting of alkyl, aryl, halogen, alkoxy, aryloxy, amino, alkylthio, and arylthio; Z is selected from the group consisting of oxygen and sulfur; and $n$ is a whole number of from 1 to 3; with (b) from 1 to 3 moles of a compound having the formula YR'R''R''' wherein Y is selected from the group consisting of phosphorous, arsenic and antimony; and R', R'' and R''' are selected from the group consisting of alkyl, aryl, alkoxy, aryloxy, amino, alkylthio, and arylthio groups.

In carrying out the process of this invention to produce the novel phosphoranes, arsanes and stibanes, it has been found that for each one mole of compound (a) there must be employed from one to three moles of compound (b). The reaction must be carried out under anhydrous conditions in order to prevent hydrolysis of the metalloid azide. This is achieved by carrying the reaction out in an inert atmosphere such as nitrogen, argon or the like, or under vacuum, it only being important that the reaction be carried out in the absence of both oxygen and water.

In the formula above it is indicated that R, R', R'' and R''' are selected from a number of listed chemical groups. Examples of suitable radicals falling within these groups include:

Aryl: $C_6H_5$;

o, m, and p-Cl—$C_6H_4$—; o, m, and p-$CH_3$—$C_6H_4$—
o, m, and p-$(CH_3)_2$N—$C_6H_4$—
o, m, and p-$C_6H_5$—$C_6H_4$—
o, m, and p-$CH_3$O—$C_6H_4$—
o, m, and p-F—$C_6H_4$—
o, m, and p-Cl—$C_6H_4$—; o, m, and p-I—$C_6H_4$—
o, m, and p-$NO_2$—$C_6H_4$—
o, m, and p-$C_6H_5$O—$C_6H_4$—; α-$C_{10}H_7$—; β-$C_{10}H_7$—
2,4-$(CH_3)_2$—$C_6H_3$—; 3-$CH_3$—4-$NO_2$—$C_6H_3$— and the like;

Alkyl: $CH_3$—; $C_2H_5$—; i-$C_3H_7$—; n-$C_4H_9$—; i-$C_4H_9$—;
sec.-$C_4H_9$—; $CH_3OCH_2CH_2$—; $CH_3OCH_2CH_2CH_2$—;
$ClCH_2CH_2CH_2$—; $C_6H_5CH_2$—; $C_6H_5CH_2CH_2$—; and the like;

Halogen: F, Cl, Br, I;

Alkoxy: $CH_3O$—; $C_2H_5O$—; $C_3H_7O$—; $C_4H_9O$—;
$CH_3OCH_2CH_2O$—; and the like;

Aryloxy: $C_6H_5O$—;

o, m, and p-$CH_3$—$C_6H_4O$—; o, m, and p-F—$C_6H_4O$—
o, m, and p-Cl—$C_6H_4O$—; o, m, and p-Br—$C_6H_4O$—
o, m, and p-I—$C_6H_4O$—
o, m, and p-$(CH_3)_2$N—$C_6H_4O$—
o, m, and p-$C_6H_5$—$C_6H_4O$—
o, m, and p-$CH_3O$—$C_6H_4O$—
m and p-$C_6H_5O$—$C_6H_4O$—; o, m, and p-$NO_2$—$C_6H_4O$— and the like;

Amino: $(CH_3)_2N$—; $(C_2H_5)_2N$—; $C_6H_5NCH_3$—; and the like;

Alkylthio: $CH_3S$—; $C_2H_5S$—; $C_3H_7S$—;

$$C_2H_5SCH_2CH_2S—$$

and the like;

Arylthio: $C_6H_6S$—; o, m, and p-$CH_3$—$C_6H_4S$—; and the like.

Some suitable phosphorus azide compounds referred to as (a) above include diphenylphosphonyl azide, phenylphosphonyl diazide, phosphonyltriazide, bis-p-chlorophenylphosphonyl azide, p-chlorophenylphosphonyl diazide, bis-(m-dimethylaminophenyl)phosphonyl azide, p-phenylphenylphosphonyl diazide, m-methoxyphenylphosphonyl diazide, p-nitrophenylphosphonyl diazide, bis-p-phenoxyphenylphosphonyl azide, α-naphthylphosphonyl diazide, 2,4-xylylphosphonyl diazide, bis-3-methyl-4-nitrophenylphosphonyl azide, dibutylphosphonyl azide, methyloctylphosphonyl azide, bis-β-methoxyethylphosphonyl azide, dichlorophosphonyl azide, diethoxyphosphonyl azide, dibutoxyphosphonyl azide, dihpenoxyphosphonyl azide, bis-m-tolyloxyphosphonyl azide, bis-p-nitrophenoxyphosphonyl azide, bis-dimethylaminophosphonyl azide, bis-dimethylaminophosphonyl azide, diethylaminophosphonyl diazide, bis-S-butylphosphonyl azide, bis-S-ethylphosphonyl azide, bis(S-β-ethylthioethyl)phosphonyl azide, S-phenylphosphonyl diazide, diphenylthiophosphonyl azide, di-p-chlorophenylthiophosphonyl azide, xylylthiophosphonyl azide, dibutylthiophosphonyl azide, bis(diethylamino)thiophosphonyl azide and the like.

The compounds referred to as (b) above, are phosphines, arsines or stibenes. Examples of suitable phosphines include triphenylphosphine, tributylphosphine, trixylylphosphine, tri-p-chlorophenylphosphine, triphenylphosphite, triethylphosphite, tris(dimethylamino)phosphine, tristhiophenylphosphite, tributylphosphine and the like.

Examples of suitable arsines include triphenylarsine, tri-p-chlorophenylarsine, tritolylarsenite, tributylarsine, phenyldimethylarsine, tris(dimethylamino)arsine, and the like.

Examples of suitable stibines include triphenylstibine, tritolylstibine, tributylstibine, tris(dimethylamino)stibine, phenyldimethylstibine, and the like.

The phosphoranes, arsanes, and stibines of the present invention can also be prepared by an in situ reaction between a phosphorus halide, a metal azide, and a phosphine, arsine, or stibine. Whether the starting material is a phosphorus azide, as described above, or a phosphorus halide will depend on the availability, stability, ease of handling and the like of the particular reactants.

Examples of metalloid halides which can be used in the in situ process include diphenylphosphonyl fluoride, diphenylphosphonyl chloride, diphenylphosphonyl bromide, phenylphosphonyl dichloride, phosphonyl trichloride, bis(p-tolyl)phosphonyl trichloride, bis(p-tolyl)phosphonyl bromide, bis(α-naphthyl)phosphonyl fluoride, bis(m-phenoxyphenyl)phosphonyl chloride, bis(o-chlorophenyl)phosphonyl chloride, phenylmethylphosphonyl bromide, di-n-butylphosphonyl fluoride, methyl-n-octylphosphonyl chloride, n-octylphosphonyl dichloride, disphenylthiophosphonyl chloride, methyl-n-octylthiophosphonyl bromide, bis(p-tolyl)thiophosphonyl fluoride, bis(m-phenoxyphenyl)thiophosphonyl chloride, thiophosphonyl tribromide, and the like.

Both the direct reaction of a phosphorus azide with a phosphine, arsine, and a stibine and the in situ reaction of a phosphorus halide with a metal azide and a phosphine, arsine, or stibine must be performed under anhydrous conditions to prevent the hydrolysis of the phosphorus azide or phosphorus halide.

Also, both the direct reaction of a phosphorus azide and the in situ reaction of a phosphorus halide to yield a phosphorane, arsane, or stibane can be carried out with or without a solvent. Examples of suitable solvents include ethers, such as diethyl ether, tetrahydrofuran, dimethyl ether of ethylene glycol and the like; aromatic hydrocarbons, such as benzene, toluene, xylene, and the like; tertiary amines, such as pyridine, triethylamine and the like, and acetonitrile.

Reaction temperatures and times may vary widely depending upon the nature of the reactants and the solvent employed. For example, the reaction of diphenylphosphonyl azide with triphenylphosphine requires several hours to complete in refluxing ether, but is complete in about 15 minutes in refluxing pyridine. Furthermore, the reaction of diphenylphosphonyl azide with phenyldimethylphosphine is so vigorous at 25° that it is difficult to control. Therefore, it is best run at about 0° C. The reaction of diphenylphosphonyl azide with triphenyl stibine requires several days.

These reactions are carried out in an inert atmosphere to prevent hydrolysis of the metalloid azide and to prevent the oxidation of certain of the phosphines, arsines, and stibines used.

The preparation of compounds having Formula I is illustrated in the following examples.

*Example I*

Equimolar quantities of diphenylphosphonyl azide and triphenylphosphine are dissolved in diethyl ether. The mixture is heated to reflux for 4 hrs. During the heating period a white solid precipitate forms comprising the product diphenylphosphonimidotriphenylphosphorane. An equivalent quantity of nitrogen gas is liberated.

*Example II*

Equimolar quantities of triphenylphosphine and diphenylphosphonyl azide are dissolved in pyridine and heated under reflux yielding the same white-colored phosphorane precipitate described in Example I.

A second method for the synthesis of the phosphoranes, arsanes and stibanes results from the addition of a metalloid halide, $R_{3-n}M(=Z)(X)_n$ as defined previously wherein X is halogen, to a mixture of a metal azide and a tertiary phosphine, arsine, or stibine in a suitable solvent. This in situ process is illustrated in Example III.

*Example III*

To one mole of sodium azide and one mole of triphenylphosphine dissolved in dimethylformamide there is added one mole of diphenylphosphonyl chloride. The resulting mixture is refluxed with the liberation of nitrogen and the formation of the same white-colored product as described in Examples I and II.

*Example IV*

Equimolar quantities of sodium azide and diphenylphosphonyl chloride are refluxed in pyridine. To the refluxing solution there is added triphenylphosphine. On continued heating, nitrogen is liberated and the same phosphorane of the preceding examples is obtained.

*Example V*

One mole of bis(p-tolyl)phosphonyl azide is reacted with one mole of triphenylphosphine in refluxing ether to yield nitrogen and bis(p-tolyl)-phosphonimidotriphenylphosphorane.

*Example VI*

One mole of bis(p-chlorophenyl)phosphonyl azide and one mole of triphenylphosphine are refluxed in pyridine to yield bis(p-chlorophenyl)phosphonimidotriphenylphosphorane.

*Example VII*

One mole of triphenylphosphine is added to a refluxing benzene solution containing one mole of diphenylthiophosphonyl azide. Nitrogen is liberated and diphenylthiophosphonimidotriphenylphosphorane precipitates from the reaction mixture.

*Example VIII*

The same reactants, in the same proportions, except in refluxing pyridine yield the same phosphorane described in Example VII.

*Example IX*

To a refluxing pyridine solution containing equimolar quantities of diphenoxyphosphonyl chloride and sodium azide there is added a pyridine solution containing one mole of triphenylphosphine. Nitrogen is liberated and diphenoxyphosphonimidotriphenylphosphorane is formed.

*Example X*

Equimolar quantities of diphenylphosphonyl azide and tri(p-chlorophenyl)phosphine are refluxed to liberate nitrogen and diphenylphosphonimidotri(p-chlorophenyl)-phosphorane.

*Example XI*

One mole of triphenylphosphine is added to a refluxing benzene solution containing equimolar quantities of diethoxyphosphonyl chloride and sodium azide. There is produced nitrogen and diethoxyphosphonimidotriphenylphosphorane.

*Example XII*

Equimolar quantities of phenyldimethylphosphine and diphenylphosphonyl azide are dissolved in pyridine at 0° C. Nitrogen is liberated and diphenylphosphonimidophenyldimethylphosphorane is formed.

*Example XIII*

In a manner similar to that described in Example XII, equimolar quantities of tri-n-butylphosphine and diphenylphosphonyl azide dissolved in toluene at 0° C. yield nitrogen and diphenylphosphonimidotri-n-butylphosphorane.

*Example XIV*

Equimolar quantities of tri(p-tolyl)phosphine and diphenylthiophosphonyl azide are refluxed in pyridine to yield nitrogen and diphenylthiophosphonimidotri(p-tolyl)phosphorane.

*Example XV*

Equimolar quantities of diphenylphosphonyl azide and triphenylstibine, dissolved in the dimethyl ether of diethyl ether of diethylene glycol, yield, on refluxing, nitrogen and diphenylphosphonimidotriphenylstibane.

*Example XVI*

Equimolar quantities of trimethylphosphite and diphenylphosphonyl azide, dissolved in pyridine, react at room temperature to yield nitrogen and diphenylphosphonimidotrimethoxyphosphorane.

*Example XVII*

One mole of phenylphosphonyl dichloride is reacted with two moles of sodium azide to yield one mole of phenylphosphonyl diazide. This is then added to two moles of triphenylphosphine dissolved in pyridine. The resulting mixture is refluxed to liberate two moles of nitrogen and form phenylphosphondi(imidotriphenylphosphorane).

*Example XVIII*

One mole of phosphonyl triazide and three moles of triphenylphosphine dissolved in pyridine are refluxed to evolve nitrogen and form phosphontris(imidotriphenylphosphorane).

*Example XIX*

One mole of triphenylarsine and one mole of diphenylphosphonyl azide are refluxed in p-xylene to yield nitrogen and diphenylphosphonimidotriphenylarsane.

*Example XX*

To one mole of phenyldimethylarsine dissolved in pyridine is added one mole of diphenylphosphonyl azide. On refluxing, nitrogen is evolved and diphenylphosphonimidophenyldimethylarsane is formed.

The phosphoranes, arsanes, and stibanes of this invention are particularly suitable for use as insecticides, lubricating oil additives, ultraviolet light stabilizers for various polymeric materials, such as polyesters, vinyls, epoxies, and the like. The phosphoranes, arsanes, and stibanes are also particularly suitable for use as fire retardants.

*Example XXI*

Diphenylphosphonimidotriphenylphosphorane (2 g.) was dissolved in 4 g. of isopropyl alcohol and mixed with 20 g. of an epoxy resin having a melting point of 8–12° C., an epoxide equivalency of 190 to 210 and a viscosity of Z-5 to Z-6 on the Gardner-Holdt scale. After thorough mixing, the solvent was removed by warming the resin mixture to 70° C. at 2 mm. The mixture was then cooled to room temperature and 2 g. of diethylenetriamine was added. The mixture was thoroughly blended and deaerated under 2 mm. pressure. The resin was cast into a ⅛-in. thick panel and cured for 1 hr. at 80° C.

Using the same procedure, a similar panel was cast without the diphenylphosphonimidotriphenylphosphorane to use as a standard.

A 4 x ½ in. strip was cut from each panel, i.e., control formula and formula containing the phosphorane. The two strips were clamped on a ring stand and a 1 in. high Bunsen flame applied for 15 sec., then removed. The control sample ignited and burned vigorously for 2 min., at which time the fire had to be extinguished, having consumed from 1 to 1½ in. of the original 4 in. piece.

The sample containing the phosphorane did not ignite on the first application of flame for 15 sec.; on the second application of the Bunsen flame the sample ignited and burned for 90 sec. before extinguishing itself after consuming only ⅛ to ¼ in. of the original 4 in. piece. A third application of flame for 15 sec. again caused ignition and the sample burned for 55 sec., extinguishing itself again with no further appreciable consumption of material.

In addition to the phosphoranes, arsanes, and stibanes described above, additional compounds having the general Formula II, shown below can be prepared:

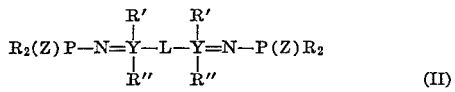

(II)

In the above formula, L can be p-phenylene; m-phenylene; 4,4'-oxydiphenylene; 3,3'-thiodiphenylene; 1,4-naphthylene; 2,2-di(4'-phenylene)propane, and the like; R can be alkyl, aryl, halogen, amino, alkoxy, aryloxy, alkylthio or arylthio; Z can be oxygen or sulfur, and Y is a metal, such as phosphorus, arsenic, or antimony. R' and R" can be alkyl, aryl, amino, alkoxy, aryloxy, alkylthio or arylthio.

The above phosphoranes, arsanes, and stibanes can be synthesized by reacting (a) one mole of an arylene or alkylene diphosphine, diarsine, or distibine having the generalized formula

R'R"Y—L—YR'R"

where R, Y, and L are defined as set forth above, with (b) 2 moles of a metalloid azide having the generalized formula

R₂P(Z)(N₃)

where R and Z are defined as above.

One compound which falls within the general Formula II, above, has the formula:

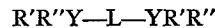

Some examples of suitable difunctional phosphines, arsines, and stibines are bis-1,4-(diphenylphosphino)butane, bis-1,5-[bis(dimethylamino)phosphino]pentane, bis-1,4-(dimethylphosphino)benzene, bis - 3,3' - (dimethoxyphosphino)diphenyl ether, 1,4-bis(diphenylarsino)butane, bis - 1,5 - [di(methylamino)arsino]pentane, bis-1,4-(dimethylarsino)benzene, bis - 4,4' - (dimethoxyarsino)diphenyl ether, bis-1,5(diphenylstibino)pentane, bis-1,3-(dimethylstibino)benzene, bis - 4,4' - (dimethoxystibino)diphenyl ether, and the like.

*Example XXII*

Two moles of diphenylthiophosphonyl azide and one mole of bis-1,4-(dimethylarsino)benzene are heated under reflux in toluene until nitrogen is no longer formed. The resulting toluene-arsane mixture can be used as such, or the toluene can be removed by distillation yielding

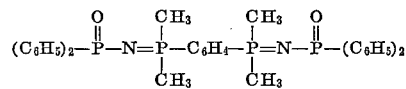

*Example XXIII*

Two moles of bis(dimethylamino)thiophosphonyl azide are slowly mixed with pyridine solution of one mole of bis - 1,3 - [bis(dimethylamino)phosphino]benzene, and then heated until nitrogen is no longer evolved. Evaporation of the solvent leaves the product

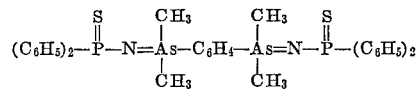

*Example XXIV*

Two moles of di[bis(dimethylamino)]phosphonyl azide are slowly mixed with one mole of bis-1,5[bis(dimethylamino)phosphino]pentane in tetrahydrofuran, and then heated until nitrogen is no longer evolved. Evaporation of the solvent yields

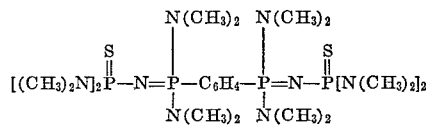

*Example XXV*

The interaction of two moles of diphenylthiophosphonyl azide and bis-1,4-(dianilinophosphino)benzene in xylene is continued until nitrogen is no longer evolved to yield

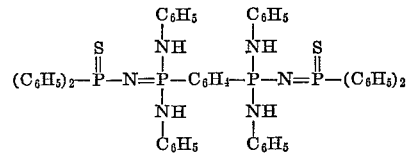

*Example XXVI*

The reaction of two moles of diphenylphosphonyl azide with one mole of bis-1,3-(diphenoxyphosphine)benzene until nitrogen no longer is evolved yields

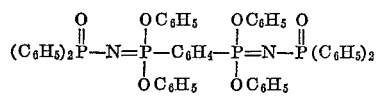

Another class of phosphoranes, arsanes, and stibanes can be prepared from phosphines, arsines, and stibanes and arylene and alkylene difunctional phosphonyl diazides to give products having the formula

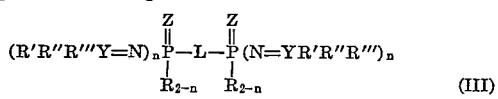

wherein the letters have the values set forth above. This class of compounds is prepared by reacting one mole of a difunctional diazide or tetraazide having the generalized formula

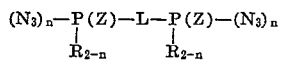

where R, L, and Z are as defined above and $n$ is a whole number of from 1 to 2, with 2 to 4 moles of a mono functional tertiary phosphine, arsine, or stibine having the formula YR'R''R''' wherein Y, R', R'' and R''' have the values set forth hereinabove. In carrying out the reaction a wide choice of reaction conditions can be used depending upon the reactants, solvent, and reaction temperature.

*Example XXVII*

Four moles of triphenylphosphine and one mole of

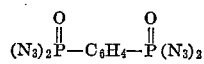

are mixed slowly and heated in pyridine until the liberation of nitrogen is complete. The pyridine solution of the resulting phosphorane can be used as such, or the pyridine can be removed by distillation to yield the product

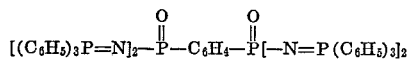

*Example XXVIII*

One mole of

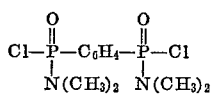

two moles of sodium azide, and two moles of triphenyl phosphine are heated in benzene until the evolution of nitrogen is complete. The reaction mixture is filtered hot to remove the sodium chloride and the benzene removed from the filtrate by distillation yielding

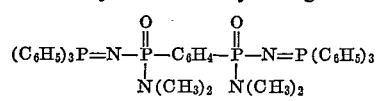

*Example XXIX*

Using the reactants and procedure of Example XXVIII, except that two moles of tributyl phosphine are used, yields

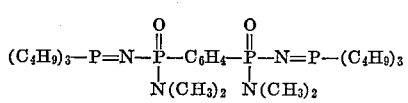

In addition to the monomeric phosphorane, arsane, and stibane compounds described above, new and useful polymeric phosphoranes, arsanes, and stibanes can be prepared. Depending on the choice of reactants, products can be prepared which are useful as hydraulic fluids, transformer oils, lubricating oils and greases. Polymeric phosphoranes, arsanes, and stibanes are also useful in conjunction with known oils, lubricants and the like because they impart thermal and ultraviolet light stability thereto.

High molecular weight polymeric phosphoranes, arsanes, and stibanes provide stable polymers which can be drawn into fibers, used for laminating glass fibers and can be made into varnishes for use in surface coatings.

Depending on the nature of the starting materials, the polymeric phosphoranes, arsanes, and stibanes are linear or cross-linked. General Formula IV represents a linear polymer, and general Formula V represents a cross-linked polymer.

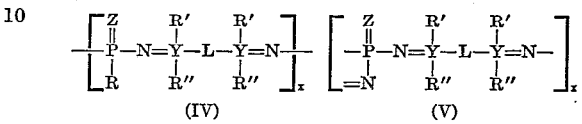

A second class of polymeric phosphoranes, arsanes, and stibanes is obtained when a difunctional phosphine, arsine, or stibine reacts with a material to which two phosphorus azide functions are bonded. This second class of polymeric phosphoranes, arsanes, and stibanes is represented by the following general Formulae VI, VII

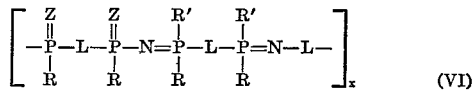

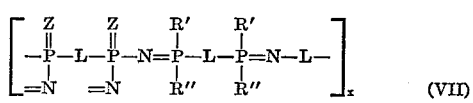

General Formula VI represents a linear polymer and general Formula VII represents a cross-linked polymer.

Examples of the polymeric phosphoranes, arsanes, and stibanes derived from phosphorus azides are shown in the following examples.

*Example XXX*

One mole of phenylphosphonyl diazide and one mole of bis-1,4-(dimethylphosphino)benzene are slowly mixed in pyridine and heated until the evolution of nitrogen is complete. The pyridine-polymer mixture can be used as such, or the pyridine can be removed by distillation to yield

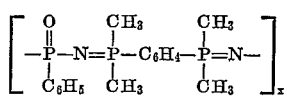

*Example XXXI*

One mole of dimethylaminophosphonyl diazide and bis-1,3-[bis(dimethylamino)phosphino]benzene react in toluene with the liberation of nitrogen. The resulting toluene-polymer mixture can be used as such, or the toluene can be removed by distillation to yield

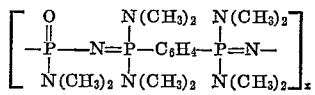

*Example XXXII*

One mole of

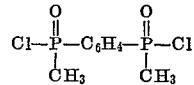

and two moles of sodium azide are placed in benzene, and the reaction mixture heated to reflux. One mole of bis-1,4-(diethylphospino)benzene is added at such a rate that nitrogen is liberated slowly. When all of the nitrogen is liberated the mixture is filtered and the product isolated by evaporation of the solvent. The product of this reaction has the formula:

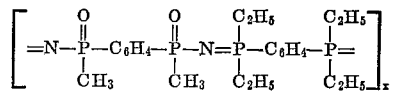

Example XXXIII

A cross-linked polymer is prepared from one mole of

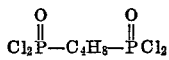

four moles of sodium azide and two moles of bis-1,4-(dimethoxyphosphino)butane by heating the reactants in xylene until nitrogen is no longer evolved. The xylene-polymer can be used as such for the preparation of varnishes, or the xylene can be removed by distillation to yield the polymer. The product of this reaction has the formula:

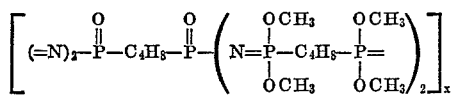

Example XXXIV

One mole of

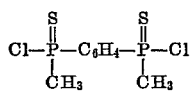

two moles of potassium azide, and one mole of bis-1,4-[bis(dimethylamino)arsino]benzene are heated in pyridine until nitrogen is no longer evolved. The resulting pyridine-polymer mixture can be used as such, or the pyridine can be removed by distillation to yield the polymer. The product of this reaction has the formula:

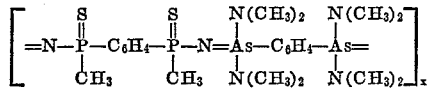

Example XXXV

One mole of

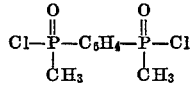

two moles of sodium azide, and one mole of bis-1,3-[bis-(dimethylamino)stibino]benzene are heated in pyridine until nitrogen is no longer evolved. The resulting pyridine-polymer mixture can be used as such, or the pyridine can be removed by distillation yielding the polymers. The product of this reaction has the formula:

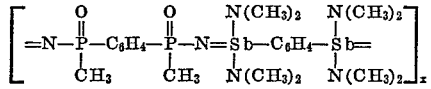

Example XXXVI

One and one-half moles of bis-1,3-(diphenoxyphosphino)benzene and one mole of phosphonyltriazide react in pyridine with the liberation of nitrogen. The resulting cross-linked polymer-pyridine mixture can be used as such or the pyridine mixture can be removed by distillation to yield

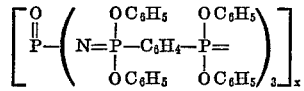

Example XXXVII

A partially cross-linked polymer may be prepared by reacting one mole of phenylphosphonyl diazide, one mole of phosphonyl triazide and two and one-half moles of bis-1,4-bis(dimethylamine)phosphino benzene in refluxing dimethylformamide.

Example XXXVIII

The interaction of equimolar amounts of

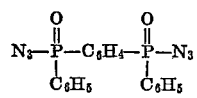

and bis-1,4-(diphenoxyphosphino)benzene in pyridine yields a polymer having the following formula after removing the solvent,

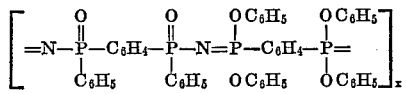

While the present invention has been described with respect to what at present are preferred embodiments thereof, it will be understood, of course, that certain changes, substitutions, modifications and the like may be made therein without departing from the true scope of the invention as defined in the appended claims.

What is claimed is:

1. A process for preparing a new compound which comprises reacting, in an inert, anhydrous environment,
    (a) one mole of a compound having the formula $$R_{3-n}P(=Z)(N_3)_n$$

where R is selected from the group consisting of alkyl, aryl, halogen, alkoxy, aryloxy, dimethylamino, diethylamino, phenylmethylamino and phenylamino, alkylthio, and arylthio groups;

Z is selected from the group consisting of oxygen and sulfur; and $n$ is a whole number of from 1 to 3; with
    (b) from 1 to 3 moles of a compound having the formula $$YR'R''R'''$$

wherein Y is selected from the group consisting of phosphorus, arsenic and antimony; and R', R'', and R''' are selected from the group consisting of alkyl, aryl, alkoxy, araloxy, dimethylamino, diethylamino, phenylmethylamino and phenylamino, alkylthio, and arylthio groups.

2. As new compositions of matter, compounds having the formula $$R_{3-n}P(=Z)(N=YR'R''R''')_n$$

wherein R is selected from the group consisting of aryl, alkyl, halogen, alkoxy, aryloxy, dimethylamino, diethylamino, phenylmethylamino and phenylamino, alkylthio, arylthio, and azide groups;

Z is selected from the group consisting of oxygen and sulfur;

Y is selected from the group consisting of phosphorous, arsenic and antimony;

R', R'', and R''' are selected from at least one of the group consisting of alkyl, aryl, alkoxy, aryloxy, dimethylamino, diethylamino, phenylmethylamino and phenylamino, alkylthio, and arylthio groups; and $n$ is a whole number of from 1 to 3.

3. Diphenylphosphonimidotriphenylphosphorane.
4. Bis(p-tolyl)phosphonimidotriphenylphosphorane.
5. Bis(p-halophenyl)phosphonimidotriphenylphosphorane.
6. Diphenylthiophosphonimidotriphenylphosphorane.
7. Diphenoxyphosphonimidotriphenylphosphorane.
8. Diethoxyphosphonimidotriphenylphosphorane.
9. Diphenylphosphonimidotri(p-halophenyl)phosphorane.
10. Diphenylphosphonimidophenyldimethylphosphorane.
11. Diphenylphosphonimidotri-n-butylphosphorane.
12. Diphenylthiophosphonimidotri(p-tolyl)phosphorane.
13. Diphenylphosphonimidotriphenylstibane.
14. Diphenylphosphonimidotrimethoxyphosphorane.
15. Phenylphosphondi(imidotriphenylphosphorane).
16. Phosphontris(imidotriphenylphosphorane).
17. Diphenylphosphonimidotriphenylarsane.
18. Diphenylphosphonimidophenyldimethylarsane.

19. A process for preparing a new compound which comprises reacting in an inert, anhydrous environment,
  (a) two moles of a compound having the formula
    $R_2P(Z)(N_3)$
    wherein R is selected from the group consisting of alkyl, aryl, halogen, alkoxy, aryloxy, dimethylamino, diethylamino, phenylmethylamino and phenylamino, alkylthio, and arylthio groups;
    Z is selected from the group consisting of oxygen and sulfur; with
  (b) one mole of a compound having the formula
    R'R"Y—L—YR'R"
    wherein Y is selected from the group consisting of phosphorus, arsenic, and antimony; and R' and R" are selected from the group consisting of alkyl, aryl, alkoxy, aryloxy, dimethylamino, diethylamino, phenylmethylamino and phenylamino, alkylthio, and arylthio groups; and L is chosen from the group consisting of arylene and alkylene.

20. As new compositions of matter, compounds having the formula

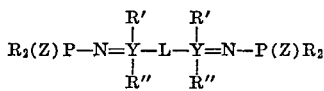

wherein R is selected from the group consisting of aryl, alkyl, halogen, alkoxy, aryloxy, dimethylamino, diethylamino, phenylmethylamino and phenylamino, alkylthio, and arylthio groups;
Z is selected from the group consisting of oxygen and sulfur;
Y is selected from the group consisting of phosphorus, arsenic, and antimony;
L is chosen from the group consisting of arylene and alkylene;
R' and R" are selected from at least one of the group consisting of alkyl, aryl, alkoxy, aryloxy, dimethylamino, diethylamino, phenylmethylamino and phenylamino, alkylthio, and arylthio.

21.
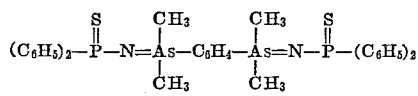

22.
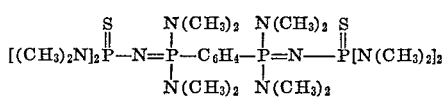

23.
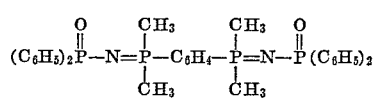

24.
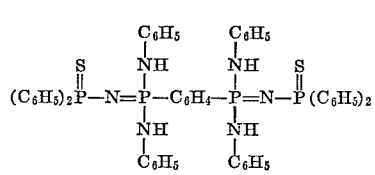

25.
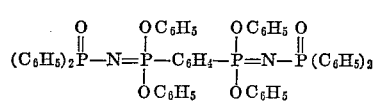

26. A process for preparing a new compound which comprises reacting in an inert, anhydrous environment,
  (a) one mole of a compound having the formula

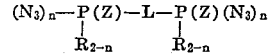

wherein R is selected from the group consisting of alkyl, aryl, halogen, alkoxy, aryloxy, dimethylamino, diethylamino, phenylmethylamino and phenylamino, alkylthio, and arylthio groups;
    Z is selected from the group consisting of oxygen and sulfur;
    L is chosen from the group consisting of alkylene and arylene; and $n$ is a whole number from 1 to 2; with
  (b) 2 to 4 moles of a compound having the formula
    YR'R"R'''
    wherein Y is selected from the group consisting of phosphorus, arsenic, and antimony; and R', R", and R''' are selected from the group consisting of alkyl, aryl, alkoxy, aryloxy, dimethylamino, diethylamino, phenylmethylamino and phenylamino, alkylthio, and arylthio groups.

27. As new compositions of matter, compounds having the formula

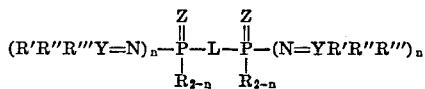

wherein R is selected from the group consisting of aryl, alkyl, halogen, alkoxy, aryloxy, dimethylamino, diethylamino, phenylmethylamino and phenylamino, alkylthio, and arylthio groups;
Z is selected from the group consisting of oxygen and sulfur;
Y is selected from the group consisting of phosphorus, arsenic, and antimony;
R', R", and R''' are selected from the group consisting of alkyl, aryl, alkoxy, aryloxy, dimethylamino, diethylamino, phenylmethylamino and phenylamino, alkylthio, and arylthio;
L is selected from the group consisting of arylene and alkylene; and $n$ is a whole number of from 1 to 2.

28.
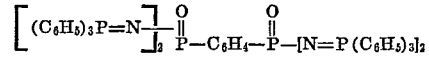

29.
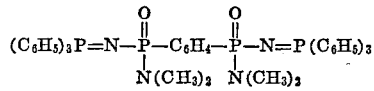

30.
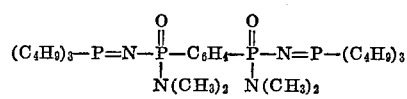

31. A process for preparing a new linear, cross-linked, and partially cross-linked polymer which comprises reacting, in an inert, anhydrous environment,
  (a) one mole of a compound having the formula $R_{3-n}P(=Z)(N_3)_n$ wherein R is selected from the group consisting of alkyl, aryl, halogen, alkoxy, aryloxy, dimethylamino, diethylamino, phenylmethylamino and phenylamino, alkylthio, and arylthio groups;
    Z is selected from the group consisting of oxygen and sulfur; and $n$ is a whole number of from 2 to 3; with
  (b) from 1 to 2 moles of a compound having the formula
    R'R"Y—L—YR'R"
    wherein Y is selected from the group consisting of phosphorus, arsenic, and antimony;

L is selected from the group consisting of arylene and alkylene; and

R' and R" are selected from the group consisting of alkyl, aryl, alkoxy, aryloxy, dimethylamino, diethylamino, phenylmethylamino and phenylamino, alkylthio, and arylthio groups.

32. As new compositions of matter polymers having the formula

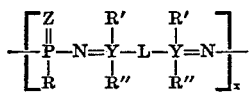

wherein R is selected from the group consisting of aryl, alkyl, halogen, alkoxy, aryloxy, dimethylamino, diethylamino, phenylmethylamino and phenylamino, arylthio, and azide groups;

Z is selected from the group consisting of oxygen and sulfur;

Y is selected from the group consisting of phosphorus, arsenic, and antimony;

L is selected from the group consisting of alkylene and arylene;

R' and R" are selected from at least one of the group consisting of alkyl, aryl, aryloxy, alkoxy, dimethylamino, diethylamino, phenylmethylamino and phenylamino, alkylthio, and arylthio groups; and $x$ indicates the degree of polymerization.

33. A linear polymer having the formula

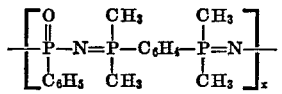

34. A linear polymer having the formula

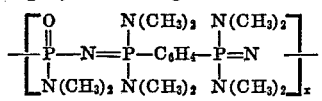

35. A cross-linked polymer having the formula

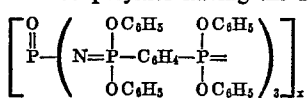

36. A process for preparing linear, cross-linked, and partially cross-linked polymers which comprises reacting, in an inert, anhydrous environment, (a) one mole of a compound having the formula

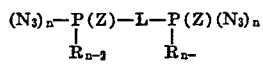

wherein R is selected from the group consisting of alkyl, aryl, halogen, alkoxy, aryloxy, dimethylamino, diethylamino, phenylmethylamino and phenylamino, alkylthio, and arylthio groups;

Z is selected from the group consisting of oxygen and sulfur;

L is selected from the group consisting of alkylene and arylene; and $n$ is a whole number of from 1 to 2; with (b) from one to two moles of a compound having the formula

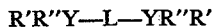

wherein Y is selected from the group consisting of phosphorus, arsenic, and antimony;

L is selected from the group consisting of alkylene and arylene; and

R' and R" are selected from at least one of the group consisting of alkyl, aryl, alkoxy, aryloxy, dimethylamino, diethylamino, phenylmethylamino and phenylamino, alkylthio, and arylthio groups.

37. As new compositions of matter, polymers having the formula

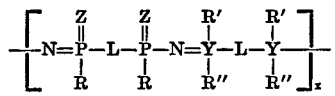

wherein R is selected from the group consisting of alkyl, aryl, halogen, alkoxy, aryloxy, dimethylamino, diethylamino, phenylmethylamino and phenylamino, arylthio, and azide groups;

Z is selected from the group consisting of oxygen and sulfur;

L is selected from the group consisting of arylene and alkylene groups;

Y is selected from the group consisting of phosphorus, arsenic, and antimony;

R' and R" are selected from at least one of the group consisting of alkyl, aryl, aryloxy, alkoxy, dimethylamino, diethylamino, phenylmethylamino and phenylamino, alkylthio, and arylthio groups; and $x$ indicates the degree of polymerization.

38. A linear polymer having the formula

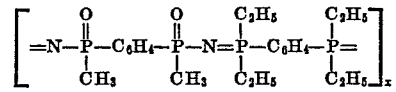

39. A cross-linked polymer having the formula

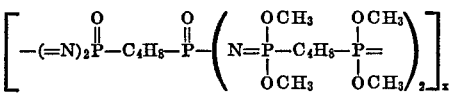

40. A linear polymer having the formula

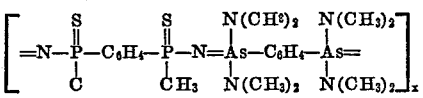

41. A linear polymer having the formula

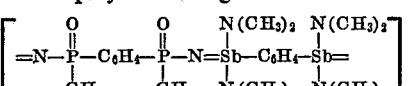

42. A linear polymer having the formula

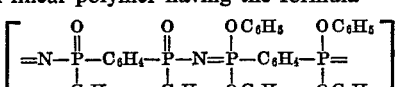

References Cited by the Examiner
UNITED STATES PATENTS 3,112,331  11/63  Washburn et al. _____ 260—2

OTHER REFERENCES

Herring, Chemistry and Industry, pp. 717–8, June 18, 1960.

Searle, Chemical Society Proceedings, pp. 7–8, January 1959.

Baldwin et al., "Journal Am. Chem. Soc.," vol. 83, November 5, 1961, pp. 4466–7.

Baldwin et al., "Am. Chem. Soc. Abstracts of Papers," 146th meeting, 1964, page 20C.

MURRAY TILLMAN, *Primary Examiner.*

L. N. BURSTEIN, *Examiner.*